United States Patent
Berezowski et al.

[11] Patent Number: 6,064,376
[45] Date of Patent: *May 16, 2000

[54] ADJUSTABLE PROGRAM GUIDE DISPLAY SYSTEM

[75] Inventors: David Michael Berezowski; John Garrett Thompson; Charles Kevin Crane, all of Tulsa, Okla.

[73] Assignee: United Video Properties, Inc., Tulsa, Okla.

[*] Notice: This patent issued on a continued prosecution application filed under 37 CFR 1.53(d), and is subject to the twenty year patent term provisions of 35 U.S.C. 154(a)(2).

[21] Appl. No.: 08/816,554

[22] Filed: Mar. 13, 1997

[51] Int. Cl.⁷ .................................................... H04N 7/173
[52] U.S. Cl. .............................. 345/327; 348/906; 348/9; 348/10; 348/6
[58] Field of Search ............................ 348/20, 445, 555, 348/556, 561, 563, 581, 906; 345/121, 327, 328, 342

[56] References Cited

U.S. PATENT DOCUMENTS

| | | | |
|---|---|---|---|
| 5,363,143 | 11/1994 | Duffield | 348/564 |
| 5,402,177 | 3/1995 | Maeshima et al. | 348/445 |
| 5,485,221 | 1/1996 | Banker et al. | 348/564 |
| 5,534,934 | 7/1996 | Katsumata et al. | 348/445 |
| 5,537,152 | 7/1996 | Ishikawa | 348/564 |
| 5,559,548 | 9/1996 | Davis et al. | |
| 5,559,549 | 9/1996 | Hendricks et al. | 348/6 |
| 5,561,472 | 10/1996 | Maietta et al. | 348/565 |
| 5,600,364 | 2/1997 | Hendricks et al. | 348/1 |
| 5,621,428 | 4/1997 | King et al. | 345/121 |
| 5,635,978 | 6/1997 | Alten et al. | 348/7 |
| 5,638,086 | 6/1997 | Linzer | 348/445 |
| 5,652,615 | 7/1997 | Bryant et al. | 348/9 |
| 5,659,350 | 8/1997 | Hendricks et al. | 348/6 |
| 5,664,087 | 9/1997 | Tani et al. | 345/328 |
| 5,673,086 | 9/1997 | Fukuoka et al. | 348/445 |
| 5,710,601 | 1/1998 | Marshall et al. | 348/906 |
| 5,745,098 | 4/1998 | Yamaji | 345/121 |

FOREIGN PATENT DOCUMENTS

| | | | |
|---|---|---|---|
| 0 301 488 | 2/1989 | European Pat. Off. | H04N 5/44 |
| WO 96/31980 | 10/1996 | WIPO | H04N 5/445 |
| WO 96/41478 | 12/1996 | WIPO | H04N 7/173 |

OTHER PUBLICATIONS

Patent Abstracts of Japan, vol. 096, No. 011 (Nov. 29, 1996)(for JP 08 181961 A—Jul. 12, 1996).

*Primary Examiner*—Andrew I. Faile
*Assistant Examiner*—Reuben M. Brown
*Attorney, Agent, or Firm*—Fish & Neave; G. Victor Treyz; Pejman F. Sharifi

[57] ABSTRACT

A television program guide system is provided in which the relative sizes of the promotional information and program listings regions can be adjusted in real time to provide different display formats. The size of the promotional information region can be increased to accommodate normal aspect ratio videos that are larger than a quarter screen. The size of the promotional information region can be reduced when a logo or similar small graphic is to be displayed in the promotional information region. Transition between different configurations can be instantaneous or can take place gradually over a period of time. Transitions can be controlled and can be synchronized with the content of the promotional information region.

30 Claims, 12 Drawing Sheets

PROMOTIONAL
INFORMATION

| FEB 24 | 4:00 | 4:30 | 5:00 |
|---|---|---|---|
| 15 MAX | THERE GOES THE NEIGHBORHOOD (COMEDY) | | |
| 16 | MURDER BY DEATH (COMEDY) (PG) (CC) | | |
| 17 TJC | TULSA PUBLIC SCHOOL (CC) | | |

PRIOR ART

| | | | |
|---|---|---|---|
| | PROMOTIONAL INFORMATION | | |
| FEB 24 | 4:00 | 4:30 | 5:00 |
| 15 MAX | THERE GOES THE NEIGHBORHOOD (COMEDY) | | |
| 16 | MURDER BY DEATH (COMEDY) (PG) (CC) | | |
| 17 TJC | TULSA PUBLIC SCHOOL (CC) | | |

38 — (points to promotional information area)
42 — (points to FEB 24 row)
40 — (points to channel 16 row)
VARIABLE (height of promotional information area)

| PROMOTIONAL INFORMATION | | | | |
|---|---|---|---|---|
| FEB 24 | 4:00 | 4:30 | 5:00 | |
| 15 MAX | THERE GOES THE NEIGHBORHOOD (COMEDY) | | | |
| 16 | MURDER BY DEATH (COMEDY) (PG) (CC) | | | |
| 17 TJC | TULSA PUBLIC SCHOOLS (CC) | | | |
| 18 HBO | THE BEVERLY HILLBILLIES (COMEDY) | | | |

| FEB 24 | 4:00 | 4:30 | 5:00 |
|---|---|---|---|
| 15 MAX | THERE GOES THE NEIGHBORHOOD (COMEDY) | | |
| 16 | MURDER BY DEATH | | |

PROMOTIONAL INFORMATION

*FIG. 9*

| FEB 24 | 4:00 | 4:30 | 5:00 |
|---|---|---|---|
| 15 MAX | THERE GOES THE NEIGHBORHOOD (COMEDY) | | |
| 16 | MURDER BY DEATH (COMEDY (PG) (CC)) | | |
| 17 TJC | TULSA PUBLIC SCHOOLS (CC) | | |
| 18 HBO | THE BEVERLY HIILBILLIES (COMEDY) | | |
| 19 SFC | AMAZING STORIES | | LOST IN SPACE |
| 20 SHO | INDEPENDENCE DAY (MOVIE) | | |

*FIG. 11*

ADJUSTABLE PROGRAM GUIDE DISPLAY SYSTEM

BACKGROUND OF THE INVENTION

This invention relates to television program guide systems, and more particularly, to television program guide systems in which promotional information is displayed in addition to program guide listings.

A large number of television channels are available over cable and satellite television systems. Television viewers have traditionally consulted preprinted television program listings to determine which programs were scheduled to be broadcast on a particular day. More recently, television-based program guides have been developed that allow television viewers to view television program listings directly on their television sets.

For example, the Prevue® channel is a scrolling television program guide that a cable system operator may make available to subscribers over a dedicated television channel. Viewers can tune to the appropriate television channel to view program listings for television programs that are currently being broadcast and that are scheduled to be broadcast in the next few hours.

The lower half of the Prevue® channel display is occupied by a continuously scrolling series of television program listings. The upper half of the Prevue® channel display screen is used to display quarter-screen promotional videos with accompanying text. Nationally distributed advertisements are displayed in the upper half of the display in place of the quarter-screen promotional videos according to a prearranged schedule. In addition, cable system operators may insert local video advertisements and graphics in the upper half of the display.

Video advertisements are typically centered in the upper half of the display. Advertisers generally prefer that the advertisements be wider than a typical quarter screen video, because this increases the visual impact of the advertisement. Because normal aspect ratio videos that are larger than a quarter screen will not fit into the upper half region, advertising videos must be matted on the left and right, vertically compressed using video processing equipment, or truncated at the top or bottom. It is sometimes possible to use a combination of such approaches.

However, truncation is generally undesirable, because important portions of the video image may be lost. Using video processing equipment to compress a video adds expense and complexity to the process of displaying the video. Moreover, overly compressed videos have an unnatural appearance, because everything in the video appears wider than normal.

It is therefore an object of the present invention to provide a television program guide system that allows normal aspect ratio videos that are larger than a quarter screen to be displayed on a television program guide channel simultaneously with program listings.

It is a further object of the present invention to provide a television program guide system in which the relative sizes of the regions used for promotional information and program listings can be adjusted in real time.

SUMMARY OF THE INVENTION

These and other objects of the invention are accomplished in accordance with the principles of the present invention by providing a television program guide system in which the relative sizes of the promotional information and program listings region can be adjusted in real time to provide different display formats.

A main facility (e.g., a satellite uplink) provides promotional videos and nationally distributed advertisements to television distribution facilities (e.g., cable headends) in the form of a global video stream. The main facility also provides a global video control stream containing commands that are synchronized to the content of the video stream. Data such as television program listings data and data used to control the configuration of the program guide display may also be provided by the main facility.

Each television distribution facility has a local promotion unit, which is a microprocessor-based system with character generator and video overlay capabilities. The local promotion units receive the program listings data and generate corresponding television program listings. The local promotion units provide a video signal containing the television program listings and containing promotional information such as promotional videos, video advertisements, graphics, and text. The television distribution facilities distribute this video signal to viewers on a dedicated television channel. Viewers may use conventional television equipment to tune to the appropriate channel.

Each viewer's display is divided into a promotional information region and a program listings region. The program listings region is typically provided on the lower portion of the display in the form of a continuously scrolling program list. If desired, program listings may be provided in the form of successive pages of program listings.

The promotional information region is typically provided on the upper portion of the display. The promotional information region can be used to display quarter screen promotional videos and accompanying text. When it is desired to replace such a display with a normal aspect ratio video larger than a quarter screen, the relative sizes of the promotional information region and program listings region can be adjusted to accommodate the video. In particular, the vertical size of the promotional information region can be increased enough to allow the video to be displayed without vertical compression and the vertical size of the program listings region can be decreased by a corresponding amount.

The relative sizes of the promotional information region and program listings region can also be adjusted to reduce the size of the promotional information region when a logo or similar small graphic is displayed in the promotional information region. Reducing the size of the promotional information region to less than a half screen allows more television program listings to be displayed for the viewer in the television program listings region.

Transitions between different size configurations for the promotional information and program listings regions can be instantaneous or can take place gradually over a period of time. The time over which gradual transitions take place can be controlled. For example, transition time commands in the global video control stream can be used to specify the amount of time it takes the local promotion unit to make such transitions.

Transitions can be synchronized with the content of the global video stream or with the content of a locally inserted video. Synchronizing the movement of the division between the promotional information and program listings regions with video content in the promotion information region creates the illusion that the content of the video is interacting with the program listings. For example, an actor could appear to be lifting the program listings up or pushing the program listings down.

Further features of the invention, its nature and various advantages will be more apparent from the accompanying drawings and the following detailed description of the preferred embodiments.

BRIEF DESCRIPTION OF THE DRAWINGS

FIG. 1 is a view of a prior art television program guide display screen showing how the upper half of the screen is used to display promotional information and the lower half of the screen is used to display scrolling television program listings.

FIGS. 5–12 are views of illustrative display screens in accordance with the present invention.

DETAILED DESCRIPTION OF THE PREFERRED EMBODIMENTS

The display screen 10 of a prior art program guide channel is shown in FIG. 1. Television program listings 12 are provided on the lower half of display screen 10. Promotional information 14, such as promotional and advertising videos, text, and graphics, are displayed on the upper half of display screen 10. The upper and lower halves of the screen have fixed sizes.

Display screen 10 is made available to viewers in a cable operator's system on a dedicated television channel (i.e., the Prevue® channel). When a viewer is interested in reviewing current program listings or viewing promotional information, the viewer can tune to that channel.

Television program listings 12 are provided by a character generator unit located in the headend facility of the cable system operator. The character generator unit periodically receives data for the program listings from a central uplink facility via satellite. Program listings 12 are provided in the form of a continuously scrolling grid. Program listings 12 primarily contain program guide information for upcoming television programs, but may also include program summaries, weather information, logos, or messages.

While the lower half of screen 10 is being used to display program listings 12, the upper half of screen 10 can be used for various purposes, such as for nationally distributed promotional videos or advertisements, local advertisements, graphics, etc.

Figure 2:
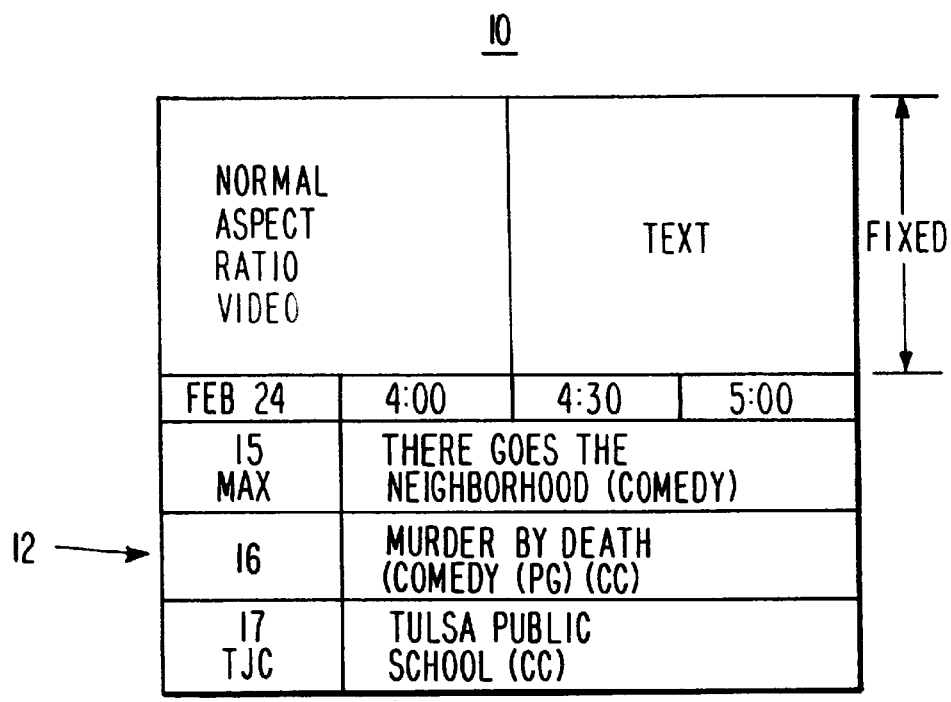
FIG. 2 is a view of a prior art television program guide showing how video with a normal aspect ratio is displayed in a quarter screen format.

Nationally distributed promotional videos are typically provided on the upper half of screen 10 by simultaneously supplying two video feeds to the character generator unit. One of the two videos is displayed on the upper half of screen 10 based on previously downloaded preferences. For example, the video from the first feed may be displayed in the upper left corner of display screen 10 (i.e., on the left side of the area reserved for promotional information 14) while corresponding text is displayed in the upper right corner, as shown in FIG. 2. Alternatively, the video from the second feed may be displayed in the upper right corner while text is displayed in the upper left corner.

Figure 3:
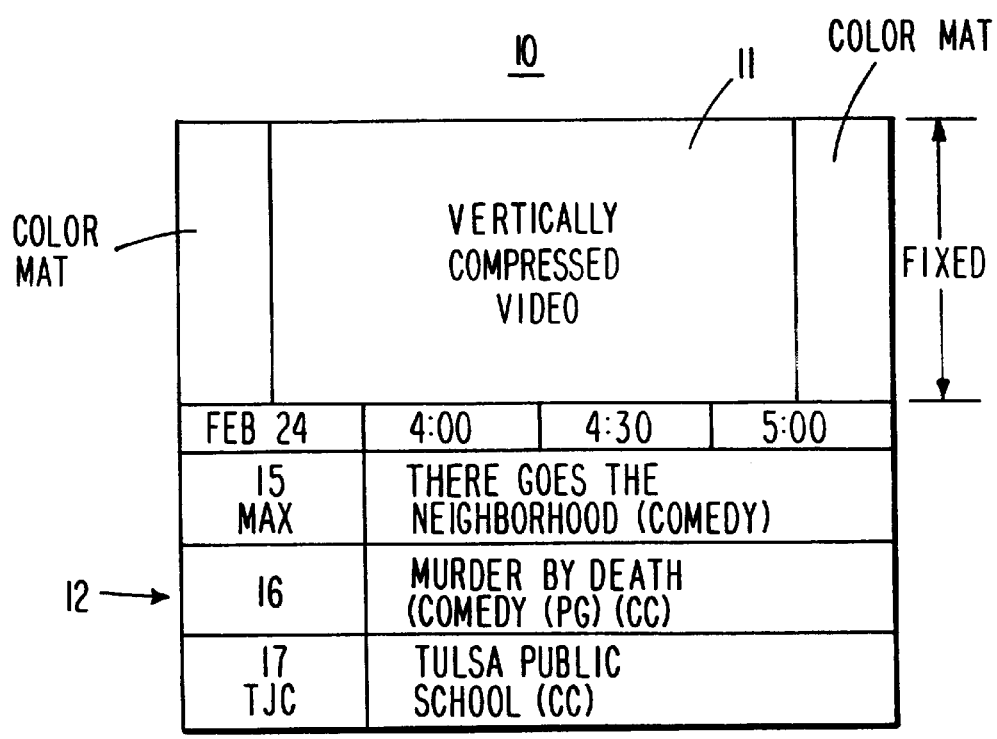
FIG. 3 is a view of a prior art television program guide display screen showing how vertical compression and matting is used to fit videos into the upper half of the screen.

Nationally distributed advertising videos are shown periodically in the upper half of display screen 10. In addition, the cable system operator is given various opportunities to overlay local advertising videos in the upper half of screen 10. Advertising videos are typically displayed using a format such as shown in FIG. 3. Because the upper half of display screen 10 is not large enough to accommodate a normal aspect ratio video that is larger than a quarter screen, video 11 is typically matted in the horizontal dimension with color mats. Video 11 is compressed in the vertical dimension.

Although the display format of FIG. 3 allows videos to be displayed that are larger than a quarter screen, this approach is not completely satisfactory. Before a video can be displayed, the video must be vertically compressed using special video processing equipment. Using such equipment adds expense and complexity to the process of displaying the video. Further, overly compressed videos have an unnatural appearance. For example, although the vertical dimension of a video for a weight loss program could be compressed, there is a risk that doing so would make the actors in the video appear to be overweight.

In accordance with the present invention, a program guide channel system is provided that allows the relative sizes of the upper and lower portions of the display screen to be adjusted in real time. In general, the upper portion of the display is a promotional information region and the lower portion of the display is a program listings region. When it is desired to promote a video, the display is divided into two equal halves. The lower half is used for program guide listings and the upper half is used for quarter screen videos with accompanying text. When it is desired to display an advertising video, the upper half of the display can be expanded to accommodate a normal aspect ratio video that is larger than a quarter screen and the lower half of the display can be contracted by a corresponding amount. In other situations, the promotional information region can be contracted (e.g., when accommodating a small logo) and the program guide listings region expanded by a corresponding amount. The relative sizes of the promotional information and program listings portions can be controlled by commands that are distributed globally (e.g., nationally or regionally) or by commands that are provided locally (e.g., at a cable system operator's headend facility).

Figure 4:
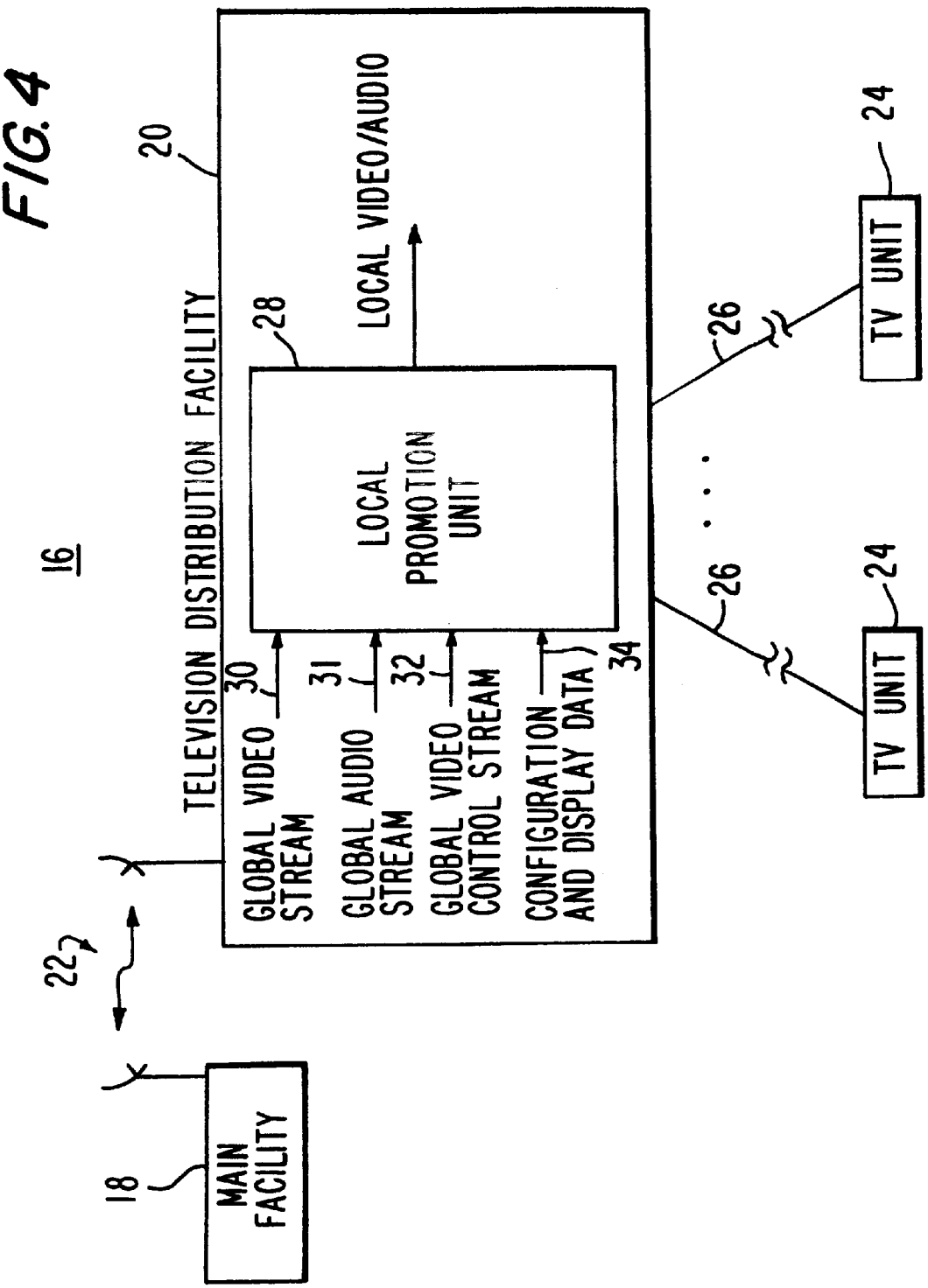
FIG. 4 is a diagram of an illustrative program guide system in accordance with the present invention.

As shown in FIG. 4, system 16 has main facility 18, which is preferably a central video and data satellite uplink facility. Main facility 18 is interconnected with multiple television distribution facilities such as television distribution facility 20 via satellite link 22. Television distribution facility 20, which is preferably a cable system headend, distributes conventional television channels and a program guide channel to television units 24 over television distribution links 26. Television units 24 are preferably conventional television sets, but could be any suitable equipment with the ability to receive a desired television channel. Television distribution links 26 may be coaxial cable links, fiber optic links, microwave links, satellite links, or a combination of any such suitable television distribution lines.

Television distribution facility 20 contains local promotion unit 28, which is preferably a microprocessor-based computer system with data input ports, video overlay and character generating capabilities, local memory, and disk data storage. For example, local promotion unit 28 may be based on a computer such as the Amiga 2000 computer with a video genlock (generator synch lock) card. Local promotion unit 28 accepts video, control, and data streams from main facility 18 and accepts locally supplied video and graphics information (e.g., for local logos, graphics, advertising videos, etc.). If desired, local promotion unit 28 may accept local input from an input interface such as a keyboard connected to unit 28 or from a locally stored control file. If local keyboard input is accepted, local promotion unit 28 preferably uses globally controlled passwords or other suitable techniques to allow the program guide service provider at the main facility 18 to maintain centralized control over the use of the program guide service.

Main facility 18 preferably provides a continuous stream of video signals for the upper left and upper right quarters of a standard display screen. This video stream may be distributed globally (i.e., on a national basis or other suitable large-scale area). When it is desired to provide a nationally distributed video advertisement, the promotional videos in the video stream are replaced by the video for the advertisement. The global video stream from main facility 18 is received by local promotion unit 28 at input 30. A corresponding multichannel audio stream may be distributed likewise and may be received by local promotion unit 28 at input 31.

Main facility 18 also provides a video control stream that is received at input 32 of local promotion unit 28. The video control stream contains commands synchronized to the content in the global video stream. The video control stream is distributed globally, but may use regional addressing, if desired. Size change commands are provided in the global video control stream when the relative sizes of the promotional information and program listings regions are to be changed. Video control commands are also used to coordinate a variety of local promotion unit functions. For example, the insertion of a local video advertisement is synchronized by providing a local insert trigger command in the global video control stream. When a local promotion unit 28 receives the local insert trigger signal, local video insertion may begin. Other video control commands may relate to display options (e.g., how the local promotion unit 28 is to determine which video (left or right) is to be displayed during national video promotion periods). Prior to displaying a national advertising video, a control command may be sent to local promotion unit 28 to instruct local promotion unit 28 to clear the upper portion of the display screen.

Local promotion unit 28 receives a general purpose data stream containing configuration and display data at input 34. In contrast to the video control stream, which is preferably provided in real time in synchronization with the video stream, the configuration and display data is typically provided to local promotion unit 28 periodically (e.g., once per day). The data provided at input 34 preferably includes the television schedule data needed to generate television program listings. The data provided at input 34 is also used by local promotion unit 28 to determine, e.g., the normal relative sizes of the promotional information and program listings regions, the speed of the program listing scroll (if the program listings are of the scrolled type), the duration of the brief hold period typically used during scrolling, the frequency with which summaries and weather and other such information are displayed, and the look-ahead time for compiling summary information for upcoming programs (e.g., a 2 hour look-ahead or a 48 hour look-ahead, etc.). Data may also be provided for displaying weather and messages interspersed with the program listings.

Local promotion unit 28 has the capability to receive promotional materials locally and to overlay these materials on top of the current video signal. For example, local promotion unit 28 can receive graphics, text, or videos. Videos may be provided to local promotion unit by laser disk, diskette, video cassette, or any other suitable storage medium or delivery mechanism. The character generator capabilities of local promotion unit 28 may be used to generate characters.

During local video insertion, local promotion unit 28 may vary the relative sizes of the promotional information and program listings regions in synchronization with the local video insert based on information in a local data file (i.e., without processing global video control commands from input 32). If desired, an authorized user at a local cable system may provide local commands to local promotion unit 28 using an input interface (not shown). For example, the user may input a test command or may change a configuration parameter, if permitted to do so by the television program guide service provider.

Television distribution facility 20 provides promotional information (whether from the global video stream or locally inserted material) and television program listings to television units 24 on a dedicated television channel. Viewers at television units 24 (FIG. 4) are presented with display screens such as display screen 36 of FIG. 5. As shown in FIG. 5, the display screen 36 contains promotional information region 38 and program listings region 40.

The program listings region 40 preferably has a status bar 42, which contains the current date and the current time (rounded off to the nearest half hour). Program listings region 40 preferably contains one grid element per channel. Each grid element may contain two lines of text. Program listings region 40 preferably has 2–4 separate time slots of television program listings (i.e., enough for 1–2 hours of programming). Program listings in region 40 are preferably provided as a scrolling list, but may be provided in the form of a series of successively displayed pages of television program listings, if desired. If local promotion unit 28 provides program listings in the form of successive pages, the transitions between pages may be instantaneous or may involve the use of a fade in and fade out between pages. Promotional information region 38 may contain text, graphics, or video.

Figure 6:
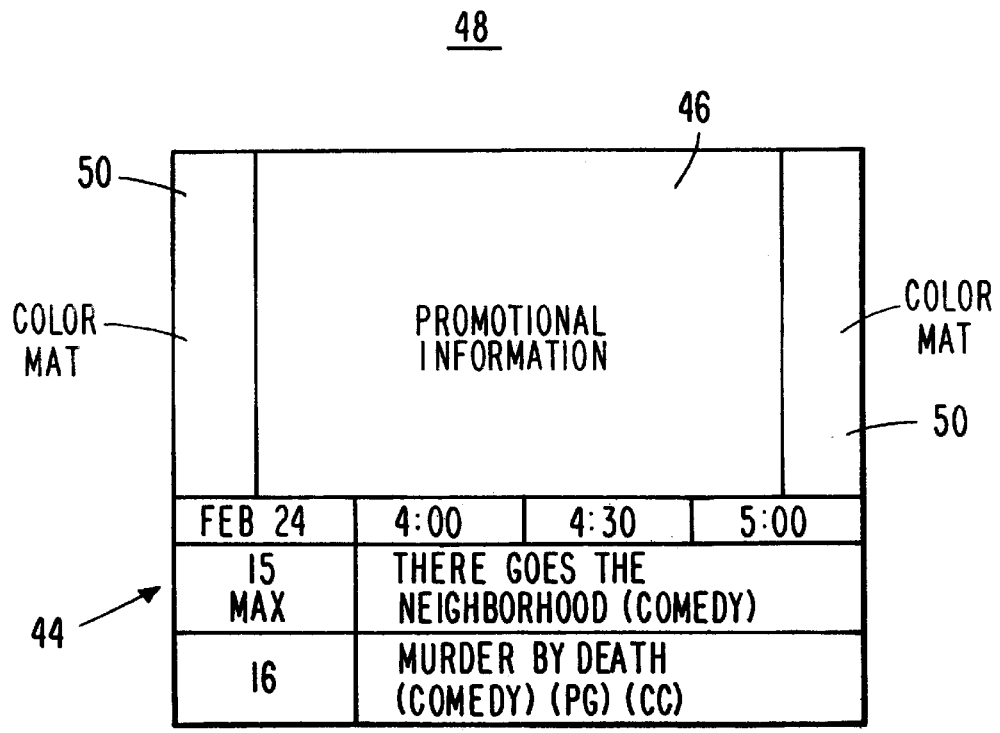

If a national advertising video is about to be transmitted via the global video stream, the global control stream can be used to issue commands to all local promotion units 28 to reduce the size of program listings region 44, as shown in FIG. 6. A global command can direct local promotion unit 28 to reduce program listings region 44 to a previously defined size (i.e., a default size) or can provide a desired size and direct local promotion unit 28 to change the size of program listings region 44 to that desired size. Because the global video stream is synchronized with the global video control stream, program listings region 44 can be reduced in size exactly when it is time to display the advertising video. Color mats 50 may be provided so that promotional information 46 does not need to be vertically compressed.

Because the format of FIG. 6 allows normal aspect ratio videos to be displayed in sizes larger than a quarter screen without any vertical compression, the FIG. 6 approach is particularly suited to situations in which it is desired to display a large image while avoiding distortion due to compression.

If desired, the display arrangement of FIG. 6 can be used during local insertion. Time periods in which it is appropriate to insert local material are preferably predefined (e.g., by downloading a schedule from main facility 18 to local promotion unit 28 via input 34). During such a period (commonly referred to as a "local avail"), promotional material such as an advertising video is inserted using local promotion unit 28. Each local avail may be accompanied by a global video control command that instructs local promotion unit 28 to reduce the size of program listings region 44. The size of the area promotional information region may also be controlled locally.

In some situations, it may be desirable to reduce the area available for promotional information and to increase the area available for program listings. For example, if local promotion unit 28 is attempting to display either the left or right promotional video feed, but determines that neither of the two video feeds currently being provided are suitable (e.g., because neither of the promoted programs is currently available to customers from the cable operator), then a default graphic such as the logo of the cable system may be displayed. As shown in FIG. 7, if such a logo occupies less than half of display screen 52, then promotional information region 54 may be reduced in size and program listings region 56 may be increased in size. Adjusting the relative sizes of the promotional information and program listings regions in this way will allow the logo to fit more evenly into the upper portion of display screen 52 and will provided the viewer with a greater number of program listing grid elements 58.

Figure 8:
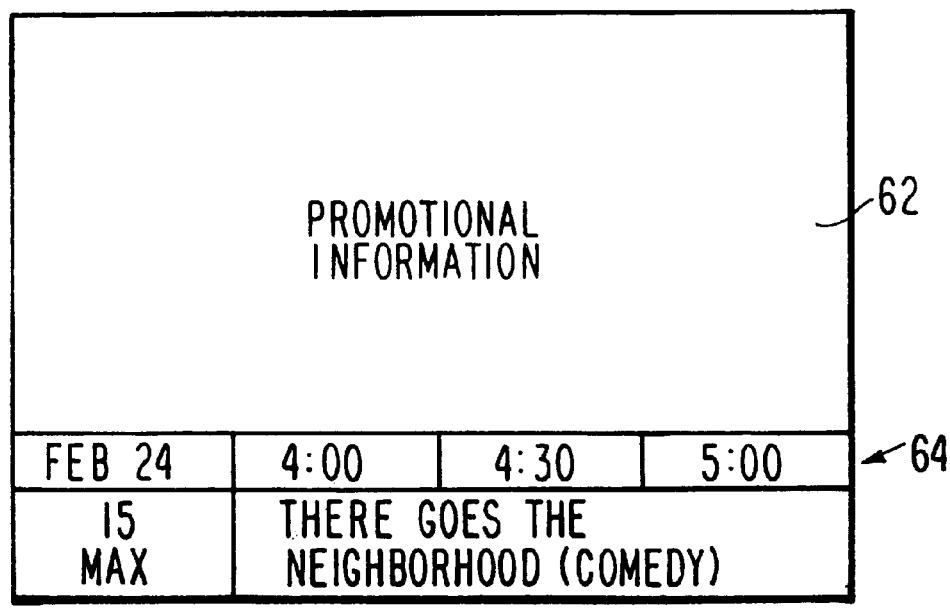

In other situations, it may be desirable to expand the size of the promotional information region considerably. For example, as shown in FIG. 8, promotional information region 62 can be expanded until there is only a single grid element remaining in program listings region 64. An arrangement such as the one shown in FIG. 8 may be particularly advantageous when it is desired to display a large graphic image, while ensuring that enough of the program listings remain on display screen 60 to remind the viewer that they are tuned to the program guide channel.

Figure 9:
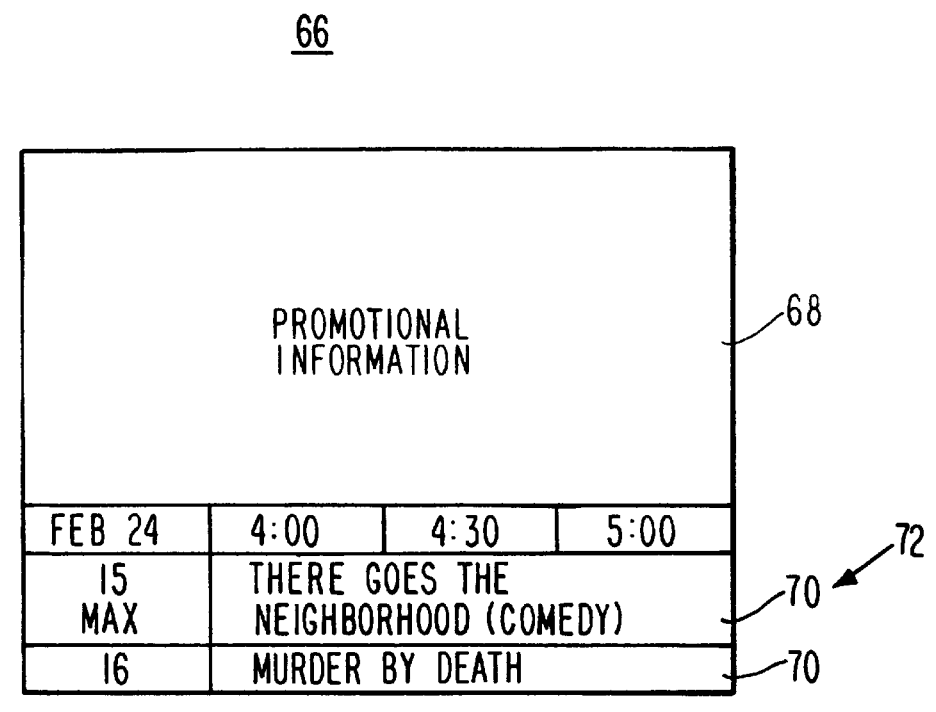

The relative size of the promotional information and program listings regions can be varied so that a noninteger number of grid elements is displayed, as shown in FIG. 9. In display screen 66, promotional information region 68 has be adjusted so that 1.5 grid elements 70 of program listings 72 are displayed. Allowing fractional program listing grid elements to be displayed is advantageous in situations in which the size of the promotional information region must be precisely adjusted to accommodate a preexisting graphic or text insert of a particular size.

Figure 10:
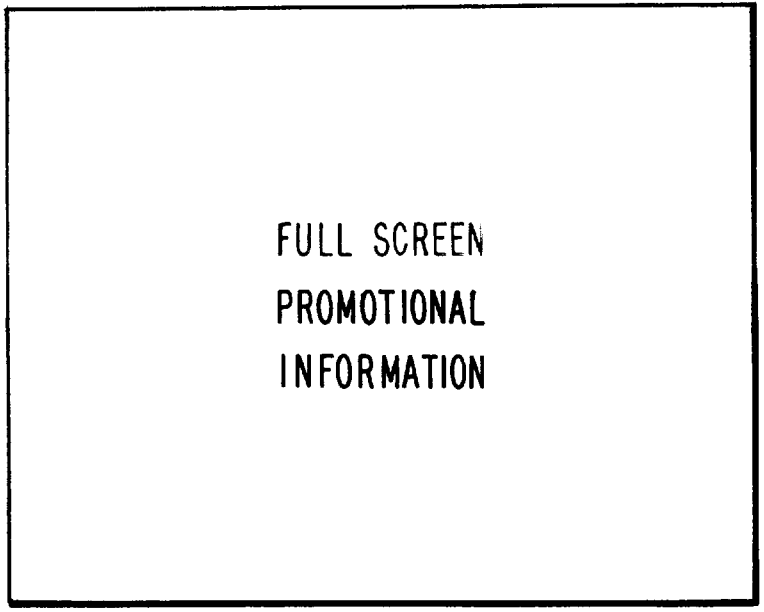

If desired, the relative sizes of the promotional information and program listing regions can be adjusted so that the screen is either entirely occupied by promotional information (FIG. 10) or is entirely occupied by program listings (FIG. 11). A full screen promotional information mode may be desirable when a video advertisement requires a particularly large screen. The full screen program listings mode may be a desirable alternative to displaying the cable system operator's logo or other default graphic when the system is unable to use either of the two promotional videos feeds that are being provided.

The transition between screen formats with different relative sizes for promotional information and program listings regions can be accomplished instantaneously by replacing one format with another or can be accomplished gradually. Instantaneous transitions may be preferred in situations in which the size required for the promotional information area varies fairly abruptly (e.g., when full size videos are interspersed with graphics that have small vertical dimensions). In other situations, smooth transitions may be considered to be more esthetically pleasing.

The speed and time of the transition is preferably controlled by a control parameter such as the transition time. A typical transition time may be in the range of approximately 0.2 to 3 seconds. Alternative techniques for controlling the transition include defining start and end times, specifying a transition velocity, acceleration, etc. Transition control parameters can be supplied in the global video control stream and processed by local promotion unit 28, so that transitions are synchronized with the global video stream. Alternatively, transition control parameters (or their local equivalent) may be generated by local promotion unit 28 (e.g., from a data file), which allows transitions to be synchronized with insertions of local material.

Figure 12:
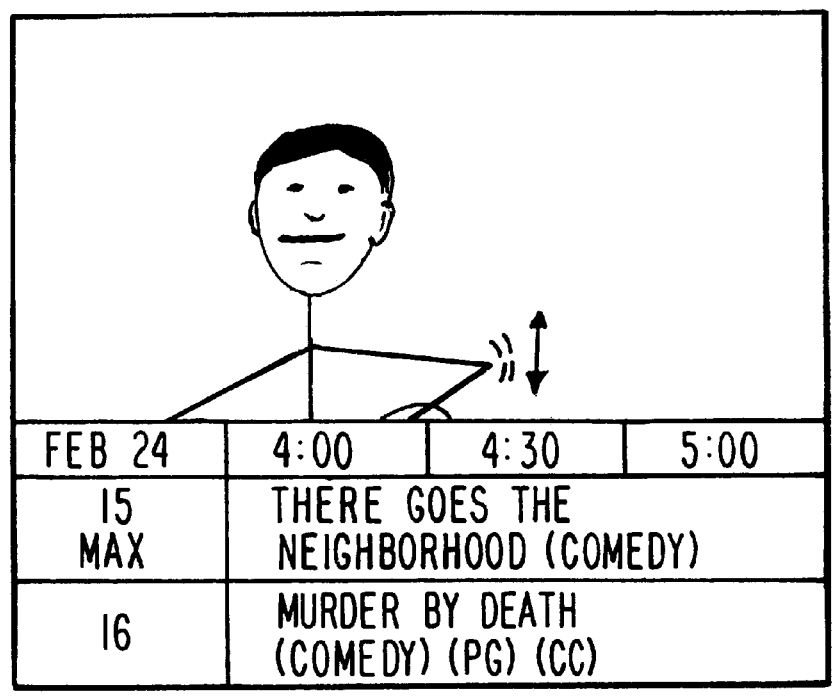

Regardless of how the transition speed is controlled, the system of the present invention allows promotional information content to be synchronized in real time with the transitions. As shown in FIG. 12, synchronizing the promotional information with the movement of the border between the program information and program listings regions can be used to produce eye-catching effects. For example, an actor in a video an move in concert with moving program listings to create the illusion that the actor is interacting with the program listings (e.g., by dragging the listings up or pushing the listings down, etc.). If desired, multiple transitions (e.g., up, down, up, down . . . ) can be used to enhance the visual impact of this approach.

The foregoing is merely illustrative of the principles of this invention and various modifications can be made by those skilled in the art without departing from the scope and spirit of the invention.

What is claimed is:

1. A system for providing promotional information and television program listings to viewer television units, each television unit having a display screen divided into a promotional information region in which the promotional information is displayed and a television program listings region in which the television program listings are displayed, comprising:

a main facility for providing the promotional information and a global video stream of promotional videos included in the promotional information; and a plurality of television distribution facilities, each connected to an associated plurality of the viewer television units, each of the plurality of television distribution facilities simultaneously receiving the global video stream in parallel, receiving television program listings data for the television program listings, and providing a video signal over a given channel so that the promotional information and the included global video stream of promotional videos are displayed on the viewer television units associated with that television distribution facility in the promotional information region and the program listings are displayed on the viewer television units associated with that television distribution facility in the program listings region, wherein each of the television distribution facilities simultaneously provides its video signal to its associated viewer television units over its given channel, wherein each of the television distribution facilities simultaneously adjusts the relative sizes of the promotional information region and the program listings region in parallel in real time as the global video stream of promotional videos is being provided by the main facility to the television distribution facilities and displayed on the viewer television units.

2. A system for providing promotional information and television program listings to viewer television units, each television unit having a display screen divided into a promotional information region in which the promotional information is displayed and a television program listings region in which the television program listings are displayed, comprising:

a main facility for providing the promotional information and a global video control stream that contains size adjustment commands; and a plurality of television distribution facilities, each connected to an associated plurality of the viewer television units, each of the plurality of television distribution facilities receiving the promotional information, simultaneously receiving the global video stream in parallel, receiving television program listings data for the television program listings, and providing a video signal over a given channel in which the promotional information is displayed in the promotional information region and the program listings are displayed in the program listings region, wherein:

each of the television distribution facilities simultaneously provides its video signal to its associated viewer television units over its given channel;

the television distribution facilities each simultaneously receive the video control stream containing the size adjustment commands in parallel; and each television distribution facility simultaneously adjusts the relative sizes of the promotional information region and the program listings region in its video signal in parallel based on the size adjustment commands when the size adjustment commands are provided by the main facility.

3. The system defined in claim 1 wherein each television distribution facility provides the promotional videos from the global video stream to each associated television unit for display in the promotional information region.

4. The system defined in claim 1 wherein the global video stream contains video advertisements, each television distribution facility providing the video advertisements to each associated television unit for display in the promotional information region, the size of the promotional information region being adjusted by the means for adjusting to accommodate the video advertisement.

5. The system defined in claim 4 wherein when the video advertisement is being displayed the size of the promotional information region is sufficient to accommodate a normal aspect ratio video larger than a quarter screen.

6. The system defined in claim 1 wherein local promotional information is provided to each television distribution facility, each television distribution facility providing the local promotional information to each associated television unit for display in the promotional information region, the size of each promotional information region being adjusted by the means for adjusting to accommodate the local promotional information.

7. The system defined in claim 6 wherein:

the local promotional information is a local video advertisement; and the size of the promotional information region is sufficient to accommodate a normal aspect ratio video larger than a quarter screen when the local video advertisement is being displayed.

8. The system defined in claim 6 wherein:

the local promotional information is a logo; and the size of the promotional information region is less than a half screen when the logo is being displayed.

9. The system defined in claim 1 wherein each adjustment to the relative size of the promotional information region and program listings region is accompanied by a transition, the system further comprising means for controlling the speed of the transitions.

10. The system defined in claim 1 wherein adjustments to the relative sizes of the promotional information region and program listings region are synchronized with the movement of content in the promotional information region.

11. The system defined in claim 10 wherein the adjustments and content are synchronized by real time control commands in a video control stream provided to each television distribution facility.

12. The system defined in claim 1 wherein the means for adjusting adjusts the relative sizes of the promotional information region and program listings region so that a full screen of promotional information is displayed.

13. The system defined in claim 1 wherein the means for adjusting adjusts the relative sizes of the promotional information region and program listings region so that a full screen of program listings is displayed.

14. The system defined in claim 1 wherein the television program listings region contains scrolling television program listings.

15. A method for providing promotional information and television program listings to viewer television units, each television unit having a display screen divided into a promotional information region in which the promotional information is displayed and a television program listings region in which the television program listings are displayed, the method comprising the steps of:

providing the promotional information and a global video stream of promotional videos included in the promotional information from a main facility to a plurality of television distribution facilities, each of the plurality of television distribution facilities being connected to an associated plurality of the viewer television units;

receiving television program listings data for the television program listings at each of the plurality of television distribution facilities; and providing a video signal over a given channel so that the promotional information and the included global stream of promotional videos are displayed on the viewer television units associated with that television distribution facility in the promotional information region and the program listings are displayed on the viewer television units associated with that television distribution facility in the program listings region wherein each of the television distribution facilities simultaneously provides its video signal to its associated viewer television units over its given channel, wherein each of the television distribution facilities simultaneously adjusts the relative sizes of the promotional information region and the program listings region in parallel in real time as the global video stream of promotional videos is being provided by the main facility to the television distribution facilities and displayed on the viewer television unit.

16. A method for providing promotional information and television program listings to viewer television units, each television unit having a display screen divided into a promotional information region in which the promotional information is displayed and a television program listings region in which the television program listings are displayed, the method comprising the steps of:

providing the promotional information, and simultaneously providing a global video control stream that contains size adjustment commands in parallel, from a main facility to a plurality of television distribution facilities, each of the plurality of television distribution facilities being connected to an associated plurality of the viewer television units;

receiving television program listings data for the television program listings at each of the plurality of television distribution facilities;

providing a video signal over a given channel in which the promotional information is displayed in the promotional information region and the program listings are displayed in the program listings region;

at each of the plurality of television distribution facilities, simultaneously providing the video signal to the associated viewer television units; and simultaneously adjusting the relative sizes of the promotional information region and the program listings region in the video signal to the associated viewer television units in parallel based on the size adjustment commands when the size adjustment commands are provided by the main facility.

17. The method defined in claim 15 further comprising the step of using each television distribution facility to provide the promotional videos from the global video stream to each associated television unit for display in the promotional information region.

18. The method defined in claim 15 wherein the global video stream contains video advertisements, the method further comprising the steps of:

using each television distribution facility to provide the video advertisements to each associated television unit for display in the promotional information region; and adjusting the size of each promotional information region to accommodate the video advertisement.

19. The method defined in claim 18 wherein when the video advertisement is being displayed the size of the promotional information region is sufficient to accommodate a normal aspect ratio video larger than a quarter screen.

20. The method defined in claim 15 further comprising the steps of:

providing local promotional information to one of the television distribution facilities;

using that television distribution facility to provide the local promotional information to each associated television unit for display in the promotional information region; and adjusting the size of each promotional information region to accommodate the local promotional information.

21. The method defined in claim 20 wherein:

the local promotional information is a local video advertisement; and the size of the promotional information region is sufficient to accommodate a normal aspect ratio video larger than a quarter screen when the local video advertisement is being displayed.

22. The method defined in claim 20 wherein:

the local promotional information is a logo; and the size of the promotional information region is less than a half screen when the logo is being displayed.

23. The method defined in claim 15 wherein each adjustment of the relative sizes of the promotional information region and program listings region is accompanied by a transition, the method further comprising the step of controlling the speed of the transitions.

24. The method defined in claim 15 further comprising the step of synchronizing the movement of content in the promotional information region with adjustments to the relative sizes of the promotional information region and program listings region.

25. The method defined in claim 24 wherein the step of synchronizing further comprises the step of providing real time control commands in a video control stream to each television distribution facility to synchronize the movement of content with the adjustments.

26. The method defined in claim 15 wherein the step of adjusting further comprises the step of adjusting the relative sizes of the promotional information region and program listings region so that a full screen of promotional information is displayed.

27. The method defined in claim 15 wherein the step of adjusting further comprises the step of adjusting the relative sizes of the promotional information region and program listings region so that a full screen of program listings is displayed.

28. The method defined in claim 15 further comprising the step of scrolling the television program listings in the television program listings region.

29. A system for providing promotional information and television program listings on a given channel to viewer television units, each television unit having a display screen divided into a promotional information region in which the promotional information is displayed and a television program listings region in which the television program listings are displayed, comprising:

a main facility for providing the promotional information and a global video stream of promotional videos included in the promotional information; and a plurality of television distribution facilities, each connected to an associated plurality of the viewer television units, each television distribution facility receiving the global video stream, receiving television program listings data for the television program listings, and providing a video signal over the given channel in which the promotional information and the included global video stream of promotional videos are displayed in the promotional information region and the program listings are displayed in the program listings region, wherein the relative sizes of the promotional information region and the program listings region are adjusted by the television distribution facility without changing at least some of the program listings in the program listings region.

30. A method for providing promotional information and television program listings on a given channel to viewer television units, each television unit having a display screen divided into a promotional information region in which the promotional information is displayed and a television program listings region in which the television program listings are displayed, the method comprising the steps of:

providing the promotional information and a global video stream of promotional videos included in the promotional information from a main facility to a plurality of television distribution facilities, each television distribution facility being connected to an associated plurality of the viewer television units;

receiving television program listings data for the television program listings at each television distribution facility; and providing a video signal over the given channel in which the promotional information and the included global stream of promotional videos are displayed in the promotional information region and the program listings are displayed in the program listings region, wherein the relative sizes of the promotional information region and the program listings region are adjusted by the television distribution facility without changing at least some of the program listings in the program listings region.

* * * * *

UNITED STATES PATENT AND TRADEMARK OFFICE
CERTIFICATE OF CORRECTION

PATENT NO.   : 6,064,376
DATED        : May 16, 2000
INVENTOR(S)  : David Michael Berezowski et al.

It is certified that error appears in the above-identified patent and that said Letters Patent is hereby corrected as shown below:

Title page,
Item [75], change "Garrett" to -- Garret --.
Item [56], References Cited, U.S. PATENT DOCUMENTS, change "Davis et al.." to -- Davis et al. --; and change "5,638,086" to -- 5,638,130 --.

Column 4,
Line 54, change "lines" to -- links --.

Column 6,
Line 25, remove bold style on "2-4".

Column 7,
Line 16, change "provided" to -- provide --.
Line 47, change "videos" to -- video --.

Column 8,
Line 13, change "an" to -- can --.

Signed and Sealed this

Twenty-eighth Day of January, 2003

JAMES E. ROGAN
*Director of the United States Patent and Trademark Office*